US010455512B1

(12) United States Patent
Lin et al.

(10) Patent No.: US 10,455,512 B1
(45) Date of Patent: Oct. 22, 2019

(54) TECHNIQUES AND APPARATUSES FOR CONFIGURING A POWER SAVING MODE OF A MODEM MODULE USING AN EXTERNAL REAL-TIME CLOCK

(71) Applicant: QUALCOMM Incorporated, San Diego, CA (US)

(72) Inventors: Lijun Lin, Chula Vista, CA (US); Vieri Vanghi, Florence (IT); Liangchi Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/037,958

(22) Filed: Jul. 17, 2018

(51) Int. Cl.
*H04B 1/38* (2015.01)
*H04W 52/02* (2009.01)
*H04M 1/725* (2006.01)
*H04W 88/02* (2009.01)

(52) U.S. Cl.
CPC .... *H04W 52/0296* (2013.01); *H04M 1/72519* (2013.01); *H04M 1/72522* (2013.01); *H04W 52/02* (2013.01); *H04W 52/0225* (2013.01); *H04W 52/0229* (2013.01); *H04W 88/02* (2013.01)

(58) Field of Classification Search
CPC ............. H04W 52/02; H04W 52/0225; H04W 52/028; H04W 88/02; H04W 52/0296; H04W 52/0229; H04M 1/72519; H04M 1/72522; H04B 1/1815
USPC ...................................... 455/574, 550.1, 418
See application file for complete search history.

(56) References Cited

U.S. PATENT DOCUMENTS 5,814,979 A * 9/1998 Grimm ................. H02M 3/156 323/271
2009/0102296 A1* 4/2009 Greene .................. H01Q 1/243 307/149
2012/0165080 A1* 6/2012 Islam ................ H04W 52/0245 455/574
2013/0203463 A1* 8/2013 Kent ....................... G06F 1/325 455/556.1
2013/0310159 A1* 11/2013 Froy ................... G07F 17/3218 463/25
2013/0326254 A1* 12/2013 Lorin .................... G06F 1/3234 713/323
2015/0198666 A1* 7/2015 Edwards ................ H03K 17/18 324/415
2017/0094599 A1* 3/2017 Eskelinen ......... H04W 52/0212
2018/0309314 A1* 10/2018 White, II ............... H02J 7/025

* cited by examiner

*Primary Examiner* — Danh C Le
(74) *Attorney, Agent, or Firm* — Harrity & Harrity, LLP Qualcomm Incorporated

(57) ABSTRACT

Various aspects of the present disclosure generally relate to wireless communication. In some aspects, a user equipment may determine, using a real-time clock (RTC) included in a microcontroller, that a modem module is to exit a power saving mode; instruct a load switch to connect the modem module to a battery of the UE based at least in part on the determination; and instruct the modem module to exit the power saving mode based at least in part on the determination. Numerous other aspects are provided.

30 Claims, 7 Drawing Sheets

300
120
PSM-aware application 360
CPU 345
RTC 355
PMU 350
Microcontroller 340
UART, USB or SPI
GPIO (PSM_MON)
GPIO (PON_TRIG)
Power Amplifier 310
Transceiver 315
Power saving mode
Modem Module 320
RTC 330
Power Mgmt IC 325
Wireless Communication (LPWA) Module 305
Vbatt
Battery 335

TECHNIQUES AND APPARATUSES FOR CONFIGURING A POWER SAVING MODE OF A MODEM MODULE USING AN EXTERNAL REAL-TIME CLOCK

FIELD OF THE DISCLOSURE

Aspects of the present disclosure generally relate to wireless communication, and more particularly to techniques and apparatuses for configuring a power saving mode of a modem module using an external real-time clock.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, using a real-time clock (RTC) included in a microcontroller, that a modem module is to exit a power saving mode; instructing a load switch to connect the modem module to a battery of the UE based at least in part on the determination; and instructing the modem module to exit the power saving mode based at least in part on the determination.

In some aspects, a UE for wireless communication may include memory and one or more processors operatively coupled to the memory. The memory and the one or more processors may be configured to determine, using a real-time clock (RTC) included in a microcontroller, that a modem module is to exit a power saving mode; instruct a load switch to connect the modem module to a battery of the UE based at least in part on the determination; and instruct the modem module to exit the power saving mode based at least in part on the determination.

In some aspects, a non-transitory computer-readable medium may store one or more instructions for wireless communication. The one or more instructions, when executed by one or more processors of a UE, may cause the one or more processors to determine, using a real-time clock (RTC) included in a microcontroller, that a modem module is to exit a power saving mode; instruct a load switch to connect the modem module to a battery of the UE based at least in part on the determination; and instruct the modem module to exit the power saving mode based at least in part on the determination.

In some aspects, an apparatus for wireless communication may include means for determining, using a real-time clock (RTC) included in a microcontroller, that a modem module is to exit a power saving mode; means for instructing a load switch to connect the modem module to a battery of the apparatus based at least in part on the determination; and means for instructing the modem module to exit the power saving mode based at least in part on the determination.

Aspects generally include a method, apparatus, system, computer program product, non-transitory computer-readable medium, user equipment, base station, microcontroller, modem module, wireless communication module, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
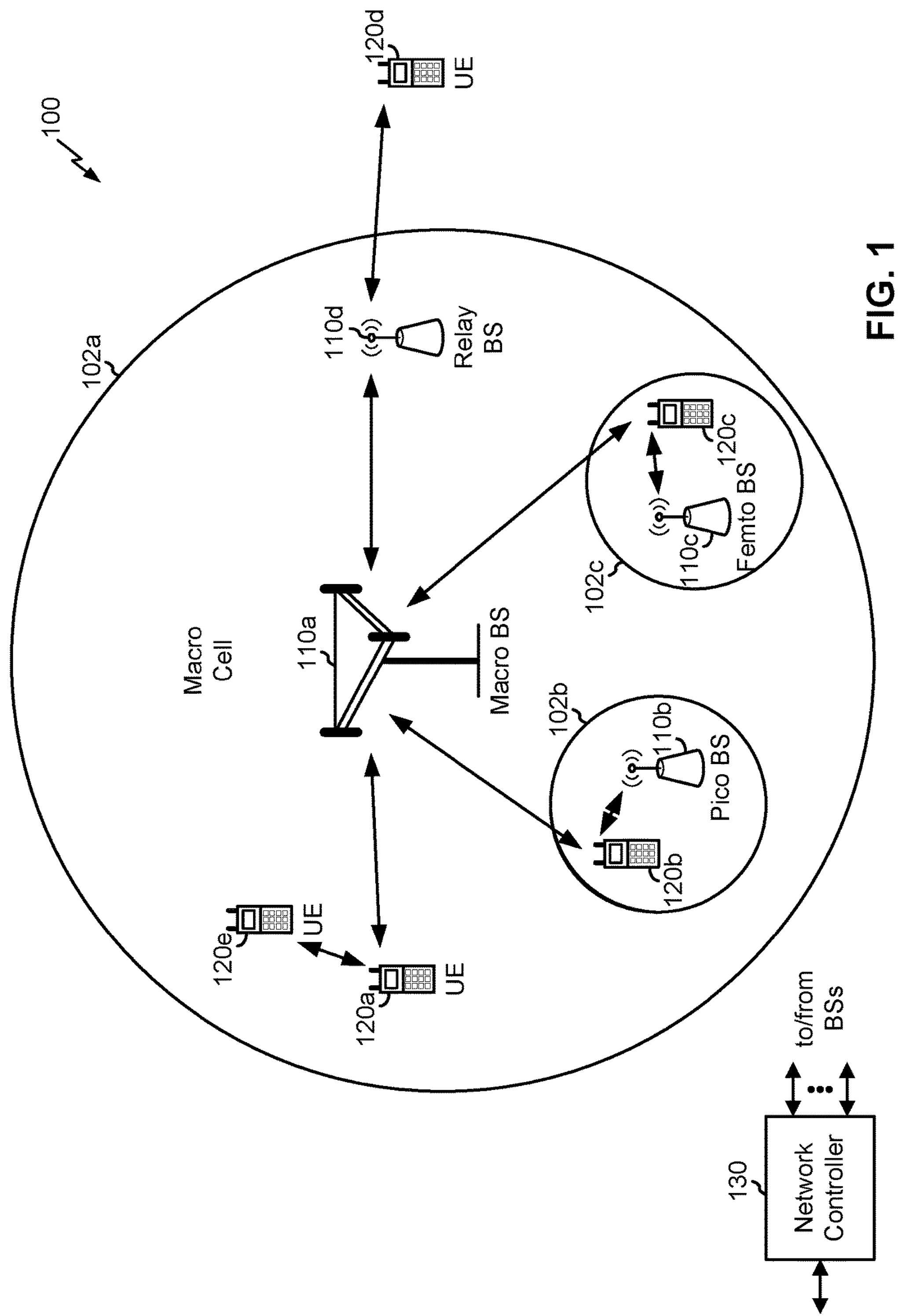
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
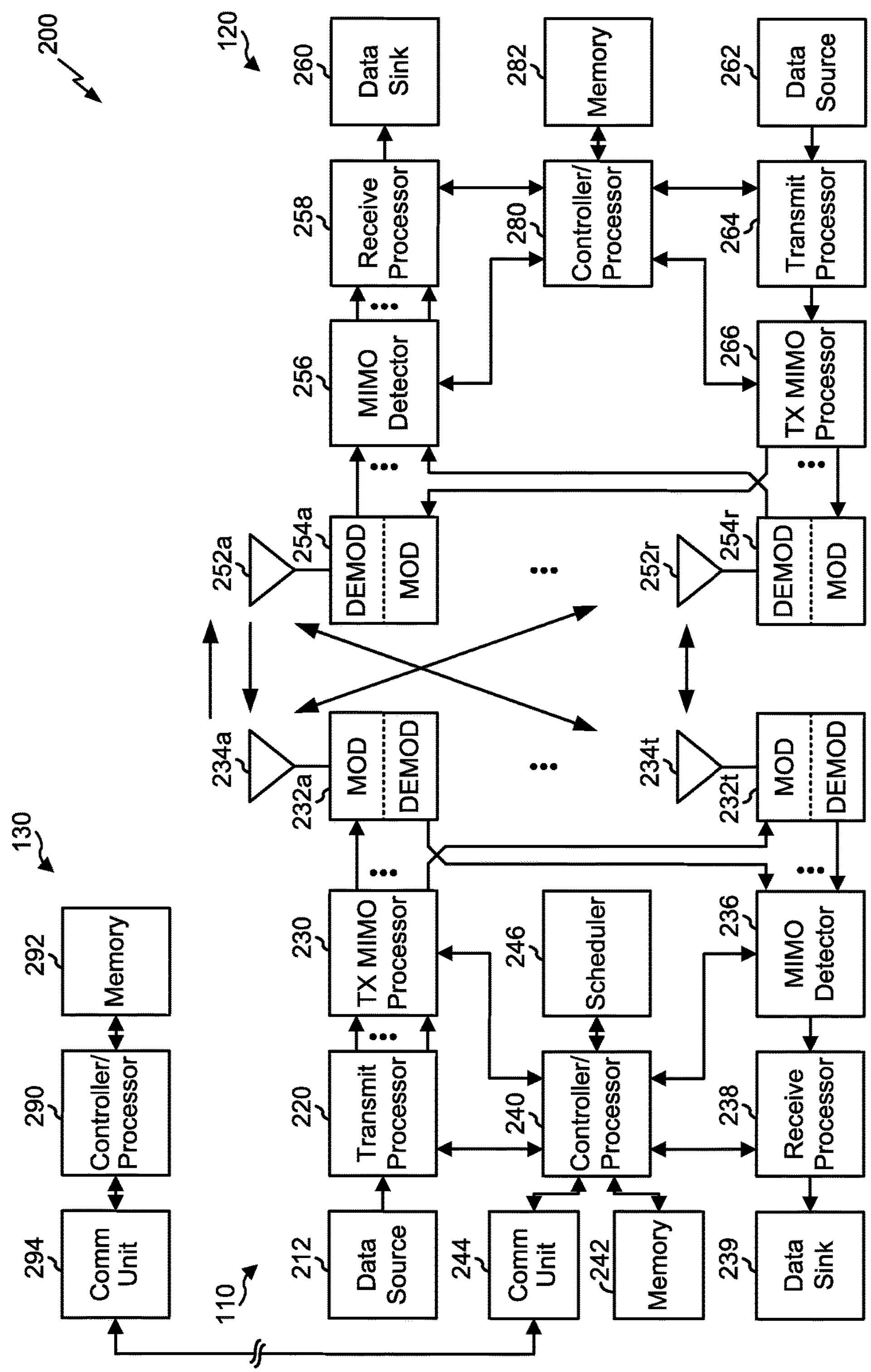
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring a power saving mode of a modem module using an external real-time clock, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining, using a real-time clock (RTC) included in a microcontroller, that a modem module is to exit a power saving mode; means for instructing a load switch to connect the modem module to a battery of the apparatus based at least in part on the determination; means for instructing the modem module to exit the power saving mode based at least in part on the determination; means for instructing the load switch to disconnect the modem module from the battery based at least in part on a determination that the modem module is to enter the power saving mode; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
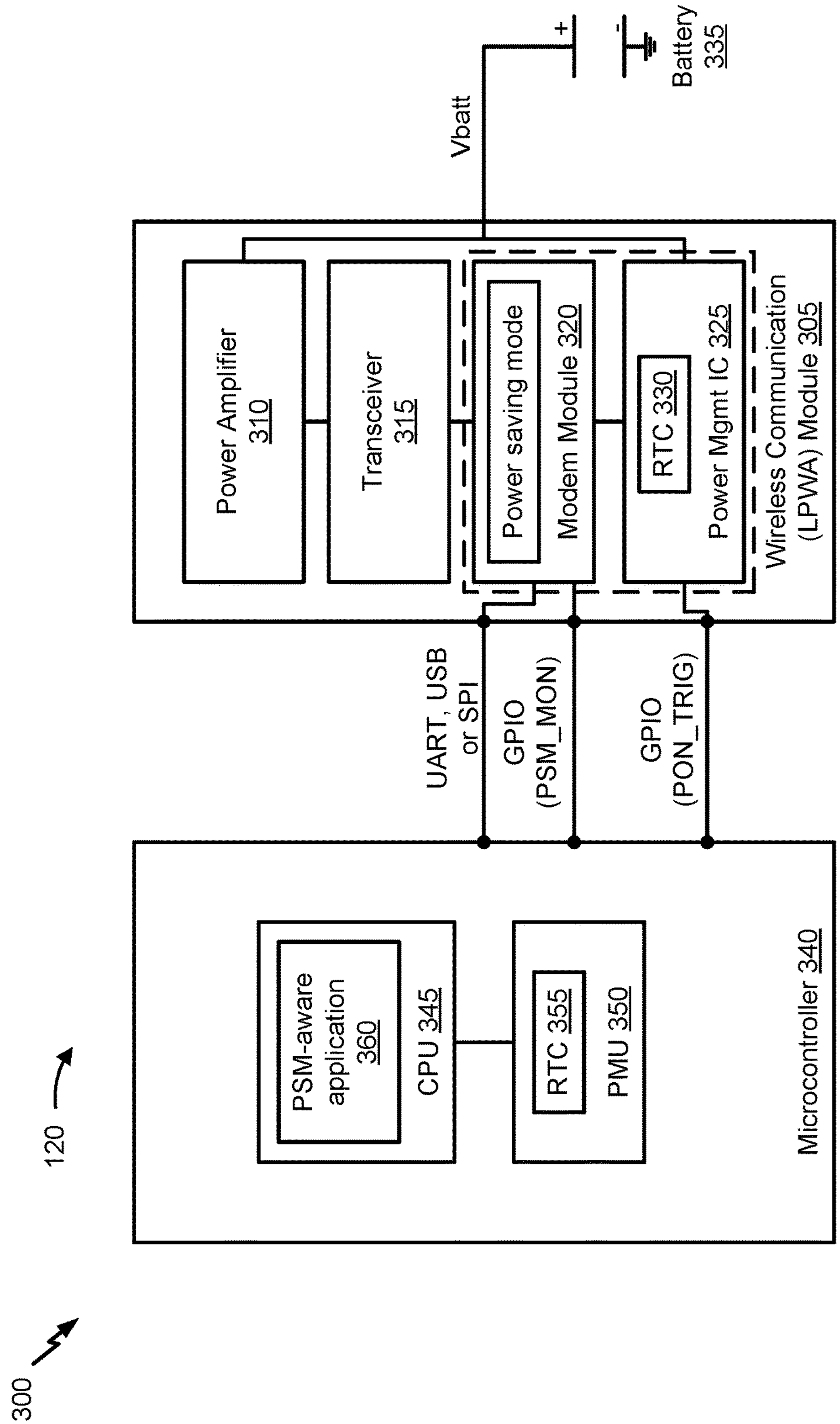
FIG. 3 is a diagram illustrating an example of a modem module that uses an internal real-time clock to configure a power saving mode.

FIG. 3 is a diagram illustrating an example 300 of a modem module that uses an internal real-time clock to configure a power saving mode.

As shown in FIG. 3, a UE 120 (e.g., an IoT UE, an MTC UE, and/or the like) may include a wireless communication module 305, such as a low power wide area (LPWA) module that includes one or more components for wireless communication (e.g., radio frequency front end components). For example, the wireless communication module 305 may include a power amplifier 310, a transceiver 315, a modem module 320 coupled to a power management integrated circuit (IC) 325 that includes a real-time clock (RTC) 330, and/or the like. The RTC 330 may be internal to the wireless communication module 305. As shown, the modem module 320 may be capable of entering and exiting a power saving mode. The wireless communication module 305 may be connected to a battery 335.

As further shown, the UE 120 may include a microcontroller 340, which may include one or more processors (shown as a central processing unit (CPU) 345), a power management unit (PMU) 350, and/or the like. The PMU 350 may include an RTC 355. The RTC 355 may be external to and separate from the wireless communication module 305, and may be internal to the microcontroller 340 (e.g., as compared to the RTC 330, which may be internal to the wireless communication module 305 and external to and separate from the microcontroller 340). The CPU 345 may store and/or execute instructions for one or more power-saving mode (PSM)-aware applications 360 executing on the UE 120. A PSM-aware application 360 may operate differently when the modem module 320 is in a power saving mode as compared to when the modem module 320 is not in the power saving mode. For example, operations of a PSM-aware application 360 may be disabled when the modem module 320 is in the power saving mode, and may be enabled when the modem module 320 is not in the power saving mode. In some aspects, the microcontroller 340 and the wireless communication module 305 (e.g., the modem module 320) may communicate using a universal asynchronous receiver-transmitter (UART) protocol, a universal serial bus (USB) protocol, a serial peripheral interface (SPI) protocol, and/or the like.

In the UE architecture of FIG. 3, both the wireless communication module 305 and the microcontroller 340 include an RTC. In this case, the modem module 320 may exit a power saving mode upon receiving a power on trigger (shown as PON_TRIG) from the microcontroller 340 (e.g., via a general purpose input/output (GPIO) signal) or after expiration of a timer stored by the RTC 330 internal to the wireless communication module 305. When in the power saving mode (e.g., when the power saving mode is active), the RTC 330 internal to the wireless communication module 305 may continue to operate and/or run, so as to trigger the modem module 320 to exit the power saving mode upon expiration of a timer controlled by the RTC 330.

However, when the wireless communication module 305 runs an RTC 330 during power saving mode, the wireless communication module 305 (e.g., the power amplifier 310, the power management IC 325, and/or the like) generates leakage current due to having a direct connection to the battery 335 to operate the RTC 330, in addition to the current required to operate the RTC 330. In some cases, particularly for low power UEs 120, the current required to operate during power saving mode may contribute significantly to battery discharge, and may reduce battery life of the UE 120.

Some techniques and apparatuses described herein (e.g., in connection with FIGS. 4-7, below) enable a UE 120 to configure operations of a power saving mode for a modem module 320 without using an RTC 330 internal to the wireless communication module 305. In this way, the RTC 330 may not draw current from the battery 335 during power saving mode, and current leakage can be prevented, thereby increasing battery life. Additional details are described below.

As indicated above, FIG. 3 is provided as an example. Other examples are possible and may differ from what was described with respect to FIG. 3.

Figure 4:
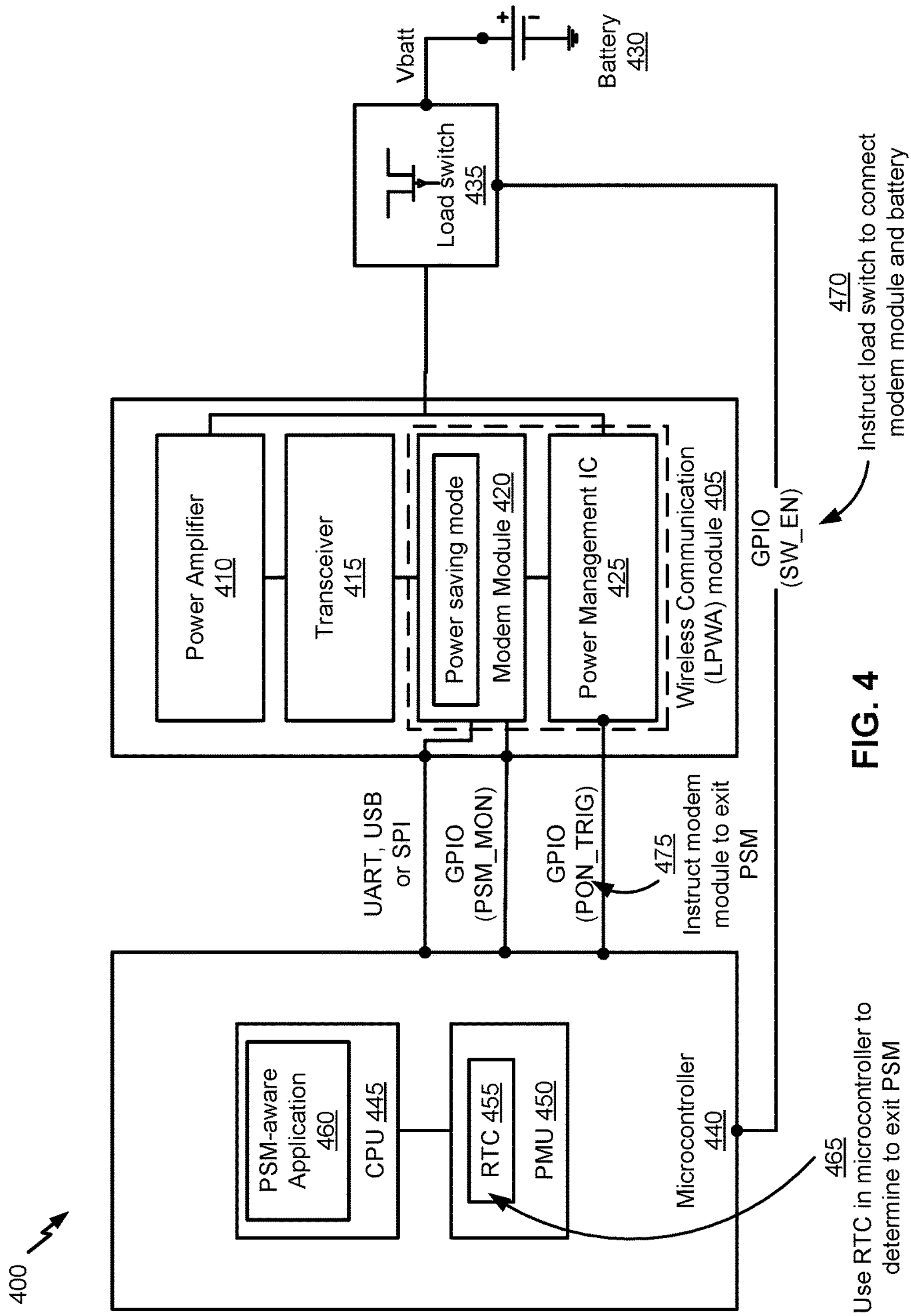
FIGS. 4 and 5 are diagrams illustrating examples of a modem module that uses an external real-time clock of a microcontroller to configure a power saving mode, in accordance with various aspects of the present disclosure.

FIG. 4 is a diagram illustrating an example 400 of a modem module that uses an external real-time clock of a microcontroller to configure a power saving mode, in accordance with various aspects of the present disclosure.

As shown in FIG. 4, a UE 120 (e.g., an IoT UE, an MTC UE, and/or the like) may include a wireless communication module 405, such as a low power wide area (LPWA) module that includes one or more components for wireless communication (e.g., radio frequency front end components). For example, the wireless communication module 405 may include a power amplifier 410, a transceiver 415, a modem module 420, a power management integrated circuit (IC) 425, and/or the like. In the UE architecture of FIG. 4, the wireless communication module 405 (e.g., the power management IC 425) does not include an RTC. As shown, the modem module 420 may be capable of entering and exiting a power saving mode. The wireless communication module 405 (e.g., the modem module 420 and/or the like) may be connected to or disconnected from a battery 430 via a load switch 435 (e.g., a low leakage load switch and/or the like). A load switch may refer to, for example, an electronic relay that can be used to turn on and turn off a power supply rail. The load switch 435 may include, for example, a low leakage load switch, an ultra-low leakage load switch, and/or the like.

As further shown, the UE 120 may include a microcontroller 440, which may include one or more processors (shown as a central processing unit (CPU) 445), a power management unit (PMU) 450, and/or the like. The PMU 450 may include an RTC 455. An RTC may refer to an integrated circuit that keeps track of the current time (e.g., time of day, date, a local time, Greenwich Mean Time, and/or the like), as opposed to a system clock that transmits clock signals to control electronic components without tracking the current time. The RTC 455 may be external to and separate from the wireless communication module 405 (which may not include an RTC), and may be internal to the microcontroller 440. The CPU 445 may store and/or execute instructions for one or more power-saving mode (PSM)-aware applications 460 executing on the UE 120. A PSM-aware application 460 may operate differently when the modem module 420 is in a power saving mode as compared to when the modem module 420 is not in the power saving mode. For example, operations of a PSM-aware application 460 may be disabled when the modem module 420 is in the power saving mode, and may be enabled when the modem module 420 is not in the power saving mode.

In the UE architecture of FIG. 4, the microcontroller 440 may include an RTC 455, and the wireless communication module 405 may not include an RTC. In this case, the modem module 420 may exit a power saving mode upon receiving a power on trigger (shown as PON_TRIG) from the microcontroller 340 (e.g., via a general purpose input/output (GPIO) signal) or after expiration of a timer stored by the RTC 455 included in the microcontroller 440. Thus, when in the power saving mode (e.g., when the power saving mode is active), the wireless communication module 405 need not continue to operate and/or run an RTC. As a result, battery power may be conserved and battery life may be extended. Furthermore, the wireless communication module 405 may be disconnected from the battery 430 using the load switch 435 when in the power saving mode, thus reducing current leakage and further conserving battery power and extending battery life (e.g., by reducing or zeroing out the current supplied to the modem module 420 and/or the wireless communication module 405).

For example, as shown by reference number 465, the UE 120 (e.g., the microcontroller 440) may determine, using the RTC 455 included in the microcontroller 440, that the modem module 420 is to exit a power saving mode. In some aspects, the determination may be based at least in part on an indication that data is available for transmission or reception by the UE 120.

As shown by reference number 470, the UE 120 (e.g., the microcontroller 440) may instruct the load switch 435 to connect the modem module 420 to the battery 430 based at least in part on determining that the modem module 420 is to exit the power saving mode. In some aspects, the microcontroller 440 may instruct the load switch 435 to connect the modem module 420 and the battery 430 using a GPIO signal (e.g., shown as SW_EN).

As shown by reference number 475, the UE 120 (e.g., the microcontroller 440) may instruct the modem module 420 to exit the power saving mode based at least in part on determining that the modem module 420 is to exit the power saving mode. In some aspects, the microcontroller 440 may instruct the modem module 420 to exit the power saving mode by sending a GPIO signal, such as a power on trigger message (shown as PON_TRIG), to the power management IC 425 coupled to and/or included in the modem module 420. Additionally, or alternatively, the microcontroller 440 may instruct the modem module 420 to exit the power saving mode using an attention (AT) command and/or the like. In some aspects, the UE 120 may instruct the modem module 420 to exit the power saving mode after instructing the load switch to connect the modem module 420 and the battery 430.

Upon exiting the power saving mode, the modem module 420 and/or one or more other components of the wireless communication module 405 may load a non-access stratum (NAS) protocol context from non-volatile memory (e.g., included in the wireless communication module 405 and/or another component of the UE 120). The NAS protocol may be used to convey non-radio signaling (e.g., control information) between the UE 120 and a mobility management entity, such as evolved packet system (EPS) mobility management (EMM) protocol information, EPS session management (ESM) protocol information, EPS connection management (ECM) protocol information, and/or the like. The NAS protocol context may indicate, for example, information related to mobility, authentication, and/or security, such as an EMM state, an ESM state, an ECM state, a UE location (e.g., a cell, a tracking area, and/or the like), packet data network (PDN) connection information, bearer information, and/or the like. In this way, the UE 120 may communicate with a base station 110, a mobility management entity, a serving gateway, a core network, and/or the like without having to re-attach to the core network. This may conserve UE resources and reduce communication delays.

In some aspects, the modem module 420 and/or the wireless communication module 405 may include a system clock, and the microcontroller 440 may configure the system clock after the modem module 420 exits the power saving mode. For example, the modem module 420 may send a notification to the microcontroller 440 (e.g., using a GPIO signal, shown as PSM_MON) indicating that the modem module 420 has completed a boot-up procedure after exiting the power saving mode. based at least in part on receiving this notification, the microcontroller 440 may configure the system clock of the modem module 420. In some aspects, the microcontroller 440 may configure the system clock using the RTC 455. For example, the microcontroller 440 may use the RTC 455 to configure and/or initialize one or more timers (e.g., a tracking area update (TAU) timer, an active timer, and/or the like) controlled by the system clock.

A system clock may refer to an integrated circuit that provides clock signals, that alternate between a high state and a low state (e.g., in the form of a square wave and/or the like), to control and/or synchronize other electronic components. The system clock may not be capable of keeping track the current time (e.g., time of day, date, a local time, Greenwich Mean Time, and/or the like), as opposed to an RTC that keeps track of the current time. The system clock may be, for example, a single-phase clock, a two-phase clock, a four-phase clock, and/or the like.

In some aspects, the modem module 420 may use the system clock to determine whether to initiate an attach request procedure with a network (e.g., a wireless wide area network, a 3G network, a 4G network, a 5G network, and/or the like). For example, the modem module 420 may use the system clock (and/or information received from the microcontroller 440 using the RTC 455) to determine an amount of time that has elapsed since a NAS protocol context was stored in non-volatile memory. If the amount of elapsed time satisfies a threshold (e.g., is greater than or equal to the threshold), then the UE 120 may not load or may discard a stored NAS protocol context, and may initiate an attach request procedure to obtain an updated NAS protocol context. If the amount of elapsed time does not satisfy the threshold (e.g., is less than or equal to the threshold), then the UE 120 may load the NAS protocol context from non-volatile memory, and may use the NAS protocol context when communicating with a network. In this way, network resources may be conserved, UE resources (e.g., processing resources, RF resources, and/or the like) may be conserved, and communication delay may be reduced by using the stored NAS protocol context.

The UE 120 may use a system time for reference timing and/or synchronization for network communications. In some aspects, this system time may be determined using the RTC 455 included in the microcontroller 440. Additionally, or alternatively, the system time may be acquired by the wireless communication module 405 and/or the modem module 420 using a cellular system, a global positioning system (GPS), and/or the like. In some aspects, the UE 120 may synchronize the system time between the microcontroller 440 and the wireless communication module 405 (e.g., the modem module 420 and/or the like) using an attention (AT) command or another messaging protocol. In some aspects, the microcontroller 440 and the wireless communication module 405 (e.g., the modem module 420) may communicate using a universal asynchronous receiver-transmitter (UART) protocol, a universal serial bus (USB) protocol, a serial peripheral interface (SPI) protocol, and/or the like.

As indicated above, FIG. 4 is provided as an example. Other examples are possible and may differ from what was described with respect to FIG. 4.

Figure 5:
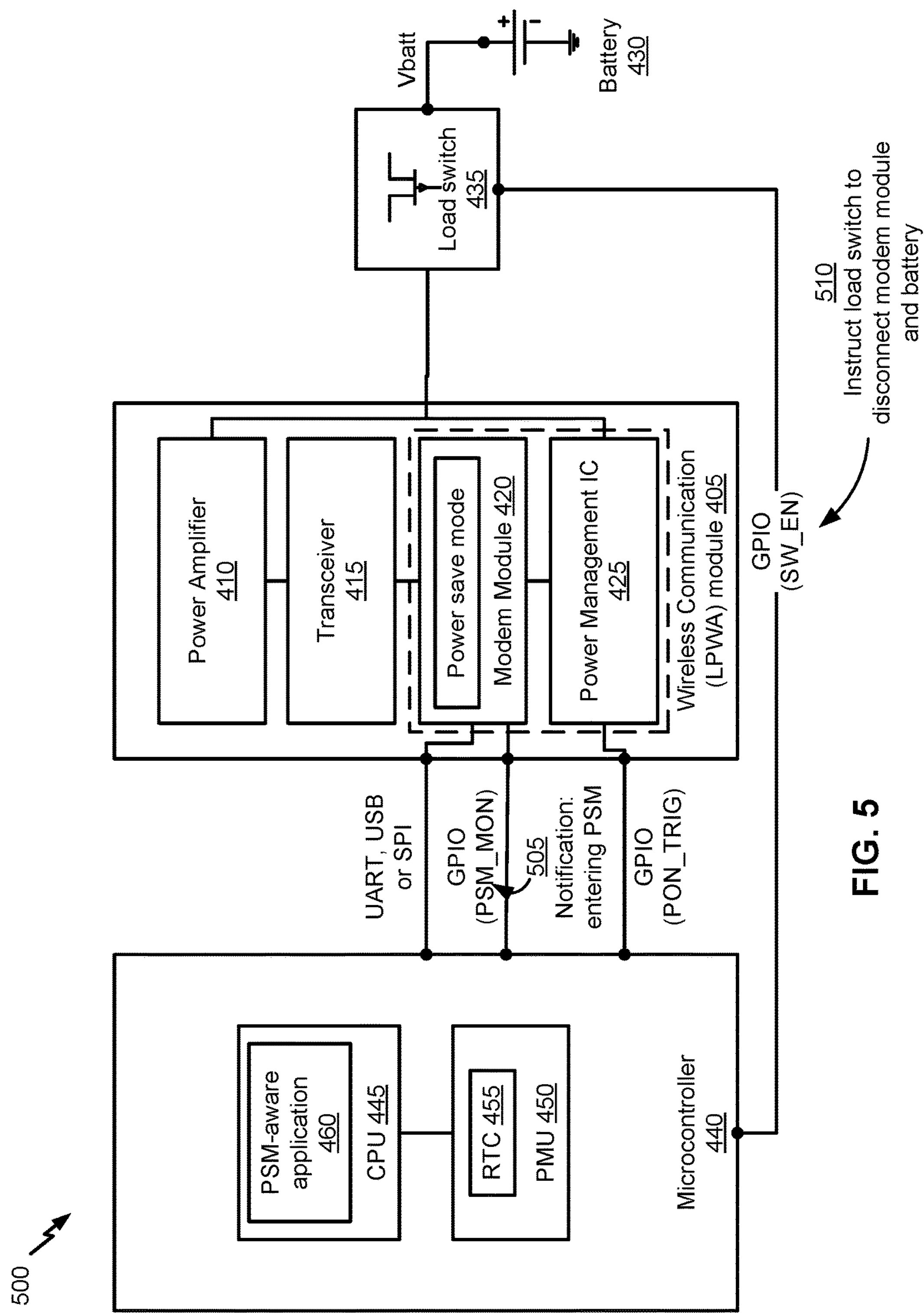

FIG. 5 is a diagram illustrating another example 500 of a modem module that uses an external real-time clock of a microcontroller to configure a power saving mode, in accordance with various aspects of the present disclosure. FIG. 5 shows the same apparatus as FIG. 4 (e.g., including wireless communication module 405, microcontroller 420, and related components). While FIG. 4 is intended to show operations associated with instructing the load switch 435 to connect the modem module 420 and the battery 430, FIG. 5 is intended to show operations associated with instructing the load switch 435 to disconnect the modem module 420 and the battery 430.

As shown by reference number 505, when the modem module 420 enters the power saving mode, the modem module 420 may provide a notification, to the microcontroller 440, that the modem module 420 is entering the power saving mode. In some aspects, a timer (e.g., an activity timer, an inactivity timer, and/or the like) of the modem module 420, that uses a system clock of the modem module 420, may expire, which may trigger the modem module 420 to enter the power saving mode. For example, the timer may expire when a threshold amount of time has elapsed without the UE 120 transmitted or receiving any information. Additionally, or alternatively, the timer may expire when a threshold amount of time has elapsed since a most recent transmission or reception by the UE 120. In some aspects, the modem module 420 may store a NAS protocol context in non-volatile memory prior to providing the notification to the microcontroller 440 (and/or prior to being disconnected from the battery 430). As described above in connection with FIG. 4, the modem module 420 may later load the NAS protocol context from the non-volatile memory after exiting the power saving mode.

As shown by reference number 510, based at least in part on the notification, the microcontroller 440 may instruct the load switch 435 to disconnect the modem module 420 (and/or the wireless communication module 405) from the battery 430. By disconnecting the modem module 420 and/or the wireless communication module 405 from the battery 430, the modem module 420 and/or the wireless communication module 405 may be prevented from drawing power from the battery and/or leaking current, thereby conserving battery power and extending battery life.

As indicated above, FIG. 5 is provided as an example. Other examples are possible and may differ from what was described with respect to FIG. 5.

Figure 6:
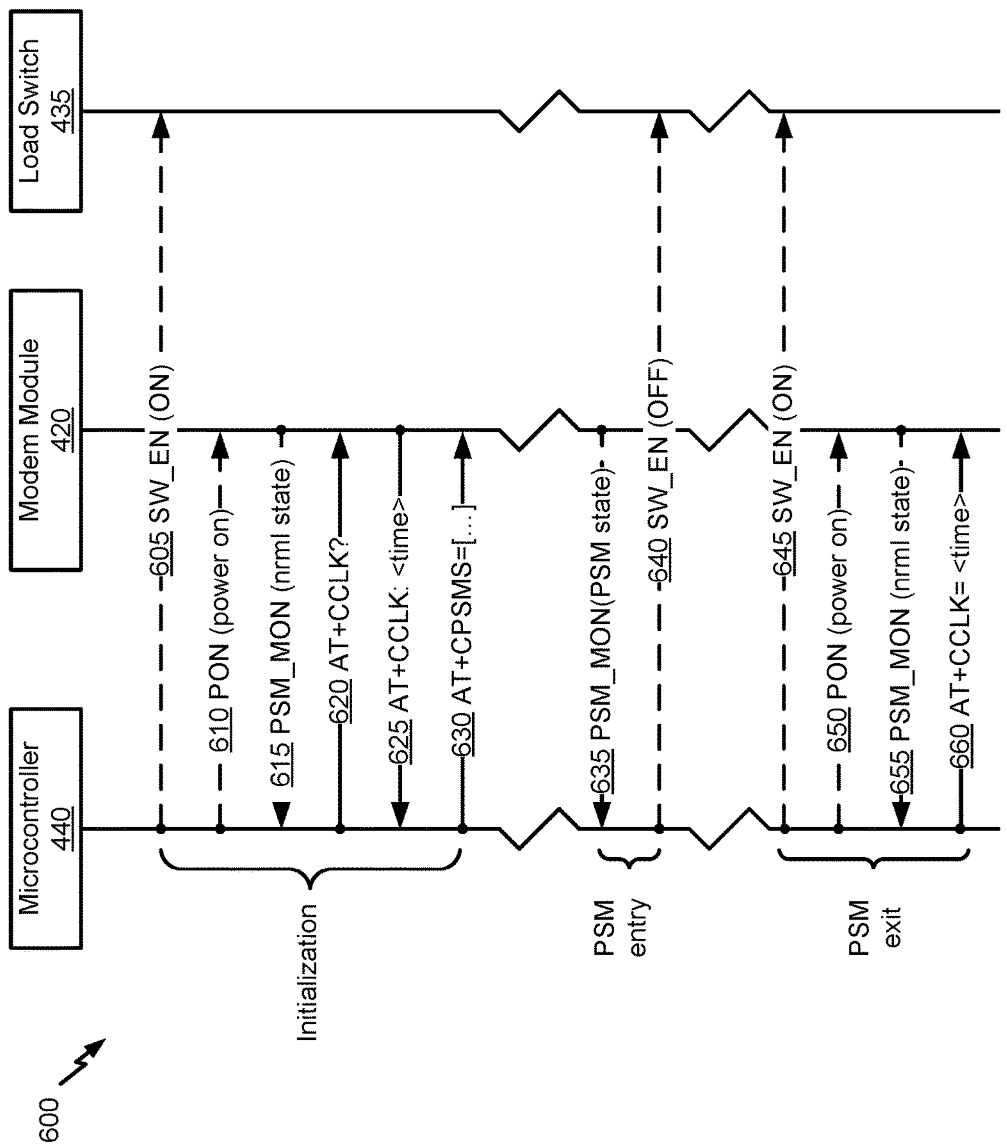
FIG. 6 is a diagram illustrating an example of configuring a power saving mode of a modem module using an external real-time clock of a microcontroller, in accordance with various aspects of the present disclosure.

FIG. 6 is a diagram illustrating an example 600 of configuring a power saving mode of a modem module using an external real-time clock of a microcontroller, in accordance with various aspects of the present disclosure. Various operations will be described in connection with FIG. 6 as being performed by the components shown and described in connection with FIG. 4 and FIG. 5.

As shown by reference number 605, as part of an initialization operation for the modem module 420, the microcontroller 440 may instruct the load switch 435 to connect the modem module 420 to a battery 430 (e.g., of a UE 120), such as by sending a first value (e.g., ON) in a SW_EN command.

As shown by reference number 610, the microcontroller 440 may instruct the modem module 420 to exit a power saving mode (e.g., to power on), such as by sending a PON command to the modem module 420.

As shown by reference number 615, upon completion of a bootup procedure, the modem module 420 may notify the microcontroller 440 that the modem module 420 has exited the power saving mode (e.g., is in a normal state), has completed the bootup procedure, and/or is ready to process attention (AT) commands. For example, the modem module 420 may set a PSM_MON pin to a first value (e.g., HIGH) to provide such notification to the microcontroller 440.

As shown by reference number 620, the microcontroller may request a current setting of a system clock (CCLK) of the modem module 420, such as by using an AT command. In some aspects, the microcontroller 440 may make this request if there is not a coordinated universal time (UTC) time source available to the microcontroller 440.

As shown by reference number 625, based at least in part on receiving the request for the current setting of the system clock, the modem module 420 may return the current setting of the system clock. In some aspects, if a UTC time source is not available, then the modem module 420 may return a default GPS time epoch. After receiving the indication of the current setting of the system clock, the microcontroller 440 may be responsible for maintaining time for the modem module 420.

As shown by reference number 630, the microcontroller 440 may configure one or more parameters for power saving mode for the modem module 420, such as by configuring a TAU timer, an activity timer, and/or the like. In some aspects, rather than the microcontroller 440 configuring a parameter, the modem module 420 may use a default parameter.

As shown by reference number 635, upon expiration of a timer internal to the modem module 420 (e.g., which may be initialized and/or configured by the microcontroller, as described above), the modem module 420 may save a NAS protocol context to non-volatile memory, and may notify the microcontroller 440 that the modem module 420 is to enter and/or has entered a power saving mode (e.g., is in a PSM state). For example, the modem module 420 may set a PSM_MON pin to a second value (e.g., LOW) to provide such a notification to the microcontroller 440.

As shown by reference number 640, based at least in part on receiving the notification that the modem module 420 has entered the power saving mode, the microcontroller 440 may instruct the load switch 435 to disconnect the modem module 420 from the battery 430, such as by sending a second value (e.g., OFF) in a SW_EN command.

As shown by reference number 645, when a power on trigger is received, such as an indication that data is available for transmission or reception by the UE 120, the microcontroller 440 may instruct the load switch 435 to connect the modem module 420 to the battery 430, such as by sending a first value (e.g., ON) in a SW_EN command.

As shown by reference number 650, after the modem module 420 has been connected to the battery 430, the microcontroller 440 may instruct the modem module 420 to exit a power saving mode (e.g., to power on), such as by sending a PON command to the modem module 420.

As shown by reference number 655, upon completion of a bootup procedure, the modem module 420 may notify the microcontroller 440 that the modem module 420 has exited the power saving mode (e.g., is in a normal state), has completed the bootup procedure, and/or is ready to process attention (AT) commands. For example, the modem module 420 may set a PSM_MON pin to a first value (e.g., HIGH) to provide such notification to the microcontroller 440.

As shown by reference number 660, the microcontroller may set a system clock of the modem module 420, such as by using an AT command. Such a setting may be used by the modem module 420 to check validity of the previously stored NAS protocol context. For example, if the NAS protocol context is stale (e.g., a threshold amount of time has elapsed since the context was stored), then the modem module 420 may initiate an attach request procedure with a network (e.g., a 4G network, an LTE network, a 5G network, and/or the like) upon establishing a data session with the network. Otherwise, if the NAS protocol context is not stale (e.g., a threshold amount of time has not elapsed since the context was stored), then the modem module 420 need not initiate an attach request procedure, and may initiate a service request instead, thereby reducing delay and conserving network resources.

As indicated above, FIG. 6 is provided as an example. Other examples are possible and may differ from what was described with respect to FIG. 6.

Figure 7:
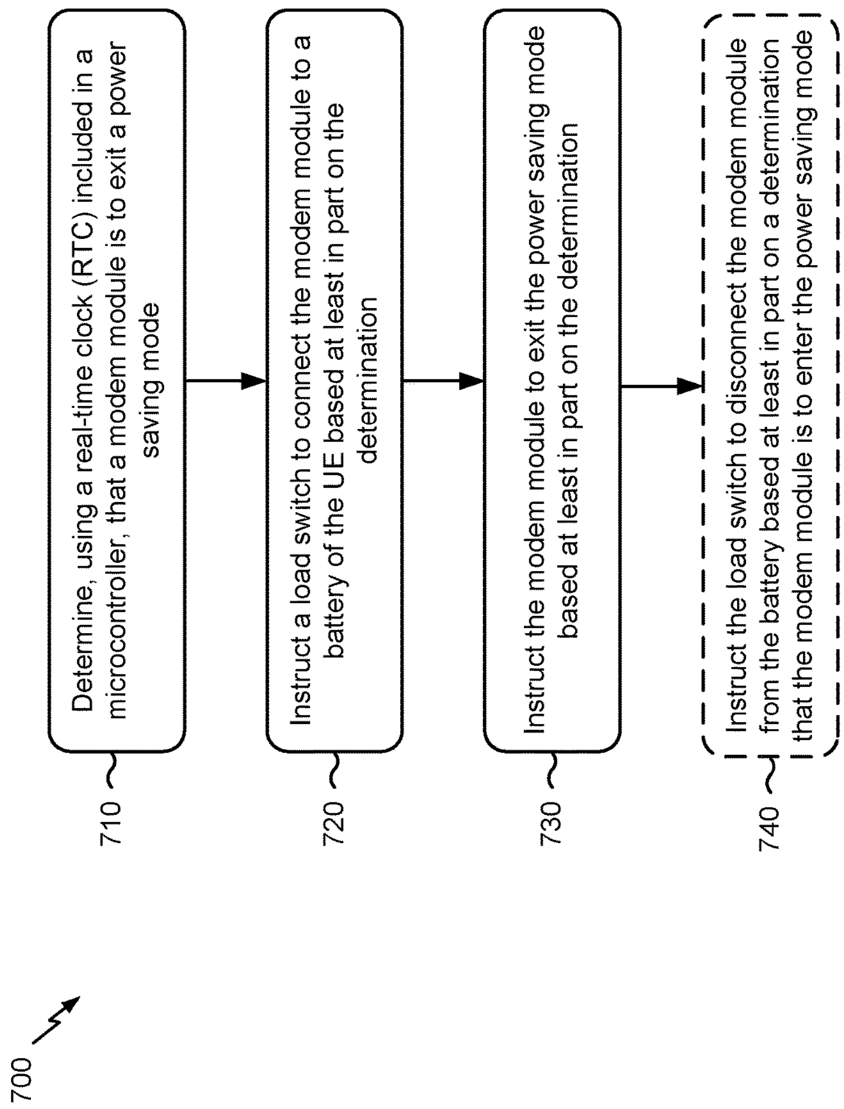
FIG. 7 is a diagram illustrating an example process relating to configuring a power saving mode of a modem module using an external real-time clock of a microcontroller, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations relating to configuring a power saving mode of a modem module using an external real-time clock.

As shown in FIG. 7, in some aspects, process 700 may include determining, using a real-time clock (RTC) included in a microcontroller, that a modem module is to exit a power saving mode (block 710). For example, the UE (e.g., using controller/processor 280, microcontroller 440, and/or the like) may determine, using an RTC included in a microcontroller, that a modem module is to exit a power saving mode, as described above in connection with FIGS. 4-5. For example, the modem module 420 may exit a power saving mode after expiration of a timer stored by the RTC 455 included in the microcontroller 440. Additionally, or alternatively, the modem module 420 may exit the power saving mode upon receiving a power on trigger (shown as PON_TRIG) from the microcontroller 340 (e.g., via a general purpose input/output (GPIO) signal), based at least in part on an indication that data is available for transmission or reception by the UE 120, and/or the like.

As further shown in FIG. 7, in some aspects, process 700 may include instructing a load switch to connect the modem module to a battery of the UE based at least in part on the determination (block 720). For example, the UE (e.g., using controller/processor 280, microcontroller 440, and/or the like) may instruct a load switch to connect the modem module to a battery of the UE based at least in part on the determination, as described above in connection with FIGS. 4-5.

As further shown in FIG. 7, in some aspects, process 700 may include instructing the modem module to exit the power saving mode based at least in part on the determination (block 730). For example, the UE (e.g., using controller/processor 280, microcontroller 440, and/or the like) may instruct the modem module to exit the power saving mode based at least in part on the determination, as described above in connection with FIGS. 4-5.

As further shown in FIG. 7, in some aspects, process 700 may instructing the load switch to disconnect the modem module from the battery based at least in part on a determination that the modem module is to enter the power saving mode (block 740). For example, the UE (e.g., using controller/processor 280, microcontroller 440, and/or the like) may instruct the load switch to disconnect the modem module from the battery based at least in part on a determination that the modem module is to enter the power saving mode, as described above in connection with FIGS. 4-5. In some aspects, a timer (e.g., an activity timer, an inactivity timer, and/or the like) of the modem module 420, that uses a system clock of the modem module 420, may expire, which may trigger the modem module 420 to enter the power saving mode. For example, the timer may expire when a threshold amount of time has elapsed without the UE 120 transmitted or receiving any information. Additionally, or alternatively, the timer may expire when a threshold amount of time has elapsed since a most recent transmission or reception by the UE 120.

Process 700 may include additional aspects, such as any single aspect or any combination of aspects described below and/or in connection with one or more other processes described elsewhere herein.

In some aspects, the modem module does not include an RTC for controlling the power saving mode of the modem module. In some aspects, the determination that the modem module is to enter the power saving mode is based at least in part on a notification from the modem module to the microcontroller based at least in part on expiration of a timer of the modem module that uses a system clock. In some aspects, the modem module stores a non-access stratum protocol context in non-volatile memory prior to being disconnected from the battery.

In some aspects, the modem module loads a non-access stratum protocol context from non-volatile memory after exiting the power saving mode. In some aspects, the modem module is instructed to exit the power saving mode using an attention (AT) command. In some aspects, the microcontroller configures a system clock of the modem module based at least in part on a notification, from the modem module, that the modem module has exited the power saving mode. In some aspects, the system clock is used to determine whether to initiate an attach request procedure with a network based at least in part on an amount of time that has elapsed since a non-access stratum protocol context was stored in non-volatile memory.

In some aspects, a system time of the UE is determined based at least in part on: the RTC included in the microcontroller, system time acquisition by the modem module using a cellular system or a global positioning system, or a combination thereof. In some aspects, the system time is synchronized between the microcontroller and the modem module using an attention (AT) command or another messaging protocol.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining, using a real-time clock (RTC) included in a microcontroller, that a modem module, included in a low power wide area module, is to exit a power saving mode;

instructing a load switch to connect the modem module to a battery of the UE based at least in part on the determination; and instructing the modem module to exit the power saving mode based at least in part on the determination.

2. The method of claim 1, wherein the low power wide area module includes a power management integrated circuit that does not include an RTC for controlling the power saving mode of the modem module.

3. The method of claim 1, further comprising instructing the load switch to disconnect the modem module from the battery based at least in part on a determination that the modem module is to enter the power saving mode.

4. The method of claim 3, wherein the determination that the modem module is to enter the power saving mode is based at least in part on a notification from the modem module to the microcontroller based at least in part on expiration of a timer of the modem module that uses a system clock.

5. The method of claim 3, wherein the modem module stores a non-access stratum protocol context in non-volatile memory prior to being disconnected from the battery.

6. The method of claim 1, wherein the modem module loads a non-access stratum protocol context from non-volatile memory after exiting the power saving mode.

7. The method of claim 1, wherein the modem module is instructed to exit the power saving mode using an attention (AT) command.

8. The method of claim 1, wherein the microcontroller configures a system clock of the modem module based at least in part on a notification, from the modem module, that the modem module has exited the power saving mode.

9. The method of claim 8, wherein the system clock is used to determine whether to initiate an attach request procedure with a network based at least in part on an amount of time that has elapsed since a non-access stratum protocol context was stored in non-volatile memory.

10. The method of claim 1, wherein a system time of the UE is determined based at least in part on:

the RTC included in the microcontroller, system time acquisition by the modem module using a cellular system or a global positioning system, or a combination thereof.

11. The method of claim 10, wherein the system time is synchronized between the microcontroller and the modem module using an attention (AT) command or another messaging protocol.

12. A user equipment (UE) for wireless communication, comprising:

memory; and one or more processors operatively coupled to the memory, the memory and the one or more processors configured to:

determine, using a real-time clock (RTC) included in a microcontroller, that a modem module, included in a low power wide area module, is to exit a power saving mode;

instruct a load switch to connect the modem module to a battery of the UE based at least in part on the determination; and instruct the modem module to exit the power saving mode based at least in part on the determination.

13. The UE of claim 12, wherein the low power wide area module includes a power management integrated circuit that does not include an RTC for controlling the power saving mode of the modem module.

14. The UE of claim 12, wherein the one or more processors are further configured to instruct the load switch to disconnect the modem module from the battery based at least in part on a determination that the modem module is to enter the power saving mode.

15. The UE of claim 14, wherein the determination that the modem module is to enter the power saving mode is based at least in part on a notification from the modem module to the microcontroller based at least in part on expiration of a timer of the modem module that uses a system clock.

16. The UE of claim 14, wherein the modem module stores a non-access stratum protocol context in non-volatile memory prior to being disconnected from the battery.

17. The UE of claim 12, wherein the modem module loads a non-access stratum protocol context from non-volatile memory after exiting the power saving mode.

18. The UE of claim 12, wherein the modem module is instructed to exit the power saving mode using an attention (AT) command.

19. The UE of claim 12, wherein the microcontroller configures a system clock of the modem module based at least in part on a notification, from the modem module, that the modem module has exited the power saving mode.

20. The UE of claim 19, wherein the system clock is used to determine whether to initiate an attach request procedure with a network based at least in part on an amount of time that has elapsed since a non-access stratum protocol context was stored in non-volatile memory.

21. The UE of claim 12, wherein a system time of the UE is determined based at least in part on:

RTC included in the microcontroller, time acquisition by the modem module using a cellular system or a global positioning system, or combination thereof.

22. The UE of claim 21, wherein the system time is synchronized between the microcontroller and the modem module using an attention (AT) command or another messaging protocol.

23. A non-transitory computer-readable medium storing one or more instructions for wireless communication, the one or more instructions comprising:

one or more instructions that, when executed by one or more processors of a user equipment (UE), cause the one or more processors to:

determine, using a real-time clock (RTC) included in a microcontroller, that a modem module, included in a low power wide area module, is to exit a power saving mode;

instruct a load switch to connect the modem module to a battery of the UE based at least in part on the determination; and instruct the modem module to exit the power saving mode based at least in part on the determination.

24. The non-transitory computer-readable medium of claim 23, wherein the low power wide area module includes a power management integrated circuit that does not include an RTC for controlling the power saving mode of the modem module.

25. The non-transitory computer-readable medium of claim 23, wherein the one or more instructions, when executed by the one or more processors, further cause the one or more processors to instruct the load switch to disconnect the modem module from the battery based at least in part on a determination that the modem module is to enter the power saving mode.

26. The non-transitory computer-readable medium of claim 23, wherein the microcontroller configures a system clock of the modem module based at least in part on a notification, from the modem module, that the modem module has exited the power saving mode.

27. An apparatus for wireless communication, comprising:

means for determining, using a real-time clock (RTC) included in a microcontroller, that a modem module, included in a low power wide area module, is to exit a power saving mode;

means for instructing a load switch to connect the modem module to a battery of the apparatus based at least in part on the determination; and means for instructing the modem module to exit the power saving mode based at least in part on the determination.

28. The apparatus of claim 27, wherein the low power wide area module includes a power management integrated circuit that does not include an RTC for controlling the power saving mode of the modem module.

29. The apparatus of claim 27, further comprising means for instructing the load switch to disconnect the modem module from the battery based at least in part on a determination that the modem module is to enter the power saving mode.

30. The apparatus of claim 27, wherein the microcontroller configures a system clock of the modem module based at least in part on a notification, from the modem module, that the modem module has exited the power saving mode.

* * * * *